United States Patent
Schwinge (10) Patent No.: US 11,491,652 B2
(45) Date of Patent: Nov. 8, 2022

(54) METHOD FOR PROGRAMMING ROBOTS AND COMPUTING DEVICE AND COMPUTER PROGRAM

(71) Applicant: VOLKSWAGEN AKTIENGESELLSCHAFT, Wolfsburg (DE)

(72) Inventor: Ralf Schwinge, Gifhorn (DE)

(73) Assignee: Volkswagen Aktiengesellschaft

( * ) Notice: Subject to any disclaimer, the term of this patent is extended or adjusted under 35 U.S.C. 154(b) by 565 days.

(21) Appl. No.: 16/551,818

(22) Filed: Aug. 27, 2019

(65) Prior Publication Data
US 2020/0061818 A1 Feb. 27, 2020

(30) Foreign Application Priority Data
Aug. 27, 2018 (DE) ...................... 10 2018 214 417.6

(51) Int. Cl.
*B25J 9/16* (2006.01)
*G06F 8/30* (2018.01)

(52) U.S. Cl.
CPC .............. *B25J 9/1658* (2013.01); *G06F 8/30* (2013.01); *G05B 2219/50391* (2013.01)

(58) Field of Classification Search
USPC .................................................. 700/245–264
See application file for complete search history.

(56) References Cited

U.S. PATENT DOCUMENTS

| 6,513,058 B2 * | 1/2003 | Brown ................. G05B 19/408 709/201 |
| 6,799,086 B2 * | 9/2004 | Toki ....................... B25J 9/1658 901/33 |
| 7,945,349 B2 * | 5/2011 | Svensson ............... B25J 9/1692 901/6 |
| 8,271,105 B2 * | 9/2012 | Brown ................... G05B 19/19 700/45 |
| 9,063,535 B2 * | 6/2015 | Yanagita ............ G05B 19/4083 |
| 9,254,567 B2 * | 2/2016 | Dai ....................... G05B 19/056 |
| 9,358,685 B2 * | 6/2016 | Meier ....................... B25J 9/163 |
| 10,272,570 B2 * | 4/2019 | Storr ....................... B25J 9/1674 |
| 2004/0006401 A1 * | 1/2004 | Yamada ................. G05B 15/02 700/83 |

(Continued)

FOREIGN PATENT DOCUMENTS

| CN | 102119072 A | 7/2011 |
| CN | 104698855 A | 6/2015 |

(Continued)

*Primary Examiner* — Jonathan L Sample
(74) *Attorney, Agent, or Firm* — Barnes & Thornburg, LLP (57) ABSTRACT

A method for programming a robot for carrying out an activity, wherein the robot is equipped with a programmable control unit and the robot programs are created using a standard program generator, wherein the program generator converts one or more sequences of keywords into valid program code for the programmable control unit so the program generator, when converting the keywords in the respective sequence, retrieves information in a programming rulebook, from which the generator receives the program code appropriate for the respective robot type in the predefined syntax, and wherein the program generator combines the received program code sections to form a complete program code.

21 Claims, 6 Drawing Sheets

(56) References Cited

U.S. PATENT DOCUMENTS

| | | | | |
|---|---|---|---|---|
| 2009/0313549 | A1* | 12/2009 | Casner | G06F 3/04842 |
| | | | | 715/740 |
| 2010/0198402 | A1* | 8/2010 | Greer | B25J 3/04 |
| | | | | 901/41 |
| 2011/0054689 | A1* | 3/2011 | Nielsen | G05D 1/0088 |
| | | | | 700/258 |
| 2014/0142754 | A1* | 5/2014 | Dai | G05B 19/056 |
| | | | | 700/245 |
| 2017/0190052 | A1* | 7/2017 | Jaekel | B25J 9/1671 |
| 2017/0320211 | A1* | 11/2017 | Akan | G06F 8/34 |
| 2018/0364265 | A1* | 12/2018 | Schwoebel | G01N 35/0099 |
| 2019/0074003 | A1* | 3/2019 | Guthery | G10L 15/02 |
| 2019/0101881 | A1* | 4/2019 | Shimamura | G05B 19/05 |
| 2020/0230817 | A1* | 7/2020 | Han, II | B25J 9/1661 |

FOREIGN PATENT DOCUMENTS

| | | |
|---|---|---|
| DE | 29605700 U1 | 6/1996 |
| DE | 10021389 A1 | 11/2001 |
| DE | 102016011020 A1 | 3/2017 |
| DE | 102016216409 A1 | 3/2018 |
| EP | 1355208 A1 | 10/2003 |
| EP | 1571514 A1 | 9/2005 |
| EP | 3316053 A1 | 5/2018 |

\* cited by examiner

Series100.txt
&COMMENT Removal and depositing
DEF SERIES100
1: PTP VB=100% VE=100% ACC=100% RobWzg=0 Base=0 SPSTrig=0[1/100s]
{Pno1=0,Pno2=-1,SPSno=-1}
  ;1:
; Wait for series start
-- G_AUF 1,M2 --
-- BTK 2 --
2: PTP VB=100% VE=100% ACC=100% RobWzg=0 Base=0 SPSTrig=0[1/100s]
{Pno1=1,Pno2=-1,SPSno=-1}
  ;1:
3: PTP VB=100% VE=100% ACC=100% RobWzg=0 Base=0 SPSTrig=0[1/100s]
{Pno1=2,Pno2=-1,SPSno=-1}
  ;1:
-- Removal position --
-- BTK 1 --
-- G_ZU 1 --
4: PTP VB=100% VE=100% ACC=100% RobWzg=0 Base=0 SPSTrig=0[1/100s]
{Pno1=3,Pno2=-1,SPSno=-1}
  ;1:
5: PTP VB=100% VE=100% ACC=100% RobWzg=0 Base=0 SPSTrig=0[1/100s]
{Pno1=4,Pno2=-1,SPSno=-1}
  ;1:
6: PTP VB=100% VE=100% ACC=100% RobWzg=0 Base=0 SPSTrig=0[1/100s]
{Pno1=5,Pno2=-1,SPSno=-1}
  ;1:
-- -M1 --
-- Deposit position --
-- G_AUF 1 --
7: PTP VB=100% VE=100% ACC=100% RobWzg=0 Base=0 SPSTrig=0[1/100s]
{Pno1=6,Pno2=-1,SPSno=-1}
  ;1:
-- WAIT FOR M2 --
-- M2 --
8: PTP VB=100% VE=100% ACC=100% RobWzg=0 Base=0 SPSTrig=0[1/100s]
{Pno1=7,Pno2=-1,SPSno=-1}
  ;1:
9: PTP VB=100% VE=0% ACC=100% RobWzg=0 Base=0 SPSTrig=0[1/100s]
{Pno1=8,Pno2=-1,SPSno=-1}
  ;1:
END

FIG. 3

```
                              Series100_generated.txt
&COMMENT Removal and depositing
DEF SERIES 100
1: PTP VB=10% VE=0% ACC=100% RobWzg=0 Base=0 SPSTrig=0[1/100s] P
{Pno1=0,Pno2=-1,SPSno=1}
    1: A15 = ON
    2: SPSMACRO0 = ON
; Wait for series start
-- Open clamping cyl. 1 --
2: PTP VB=100% VE=0% ACC=100% RobWzg=0 Base=0 SPSTrig=0[1/100s] P
{Pno1=1,Pno2=-1,SPSno=2}
    1: FB PSPS = ON
    2: A23 = OFF
    3: t1 ( EIN ) = 0[1/10sec]
    4: SPSMACRO50 = ON
    5: SPSMACRO45 = ON
    6: SPSMACRO46 = ON
    7: A15 = OFF
    8: F1 = ON
    9: SPSMACRO342 = M2
    10: SPSMACRO340 = ON
    11: WAIT FOR M31
    12: WAIT FOR M2
    13: WAIT FOR E23
    14: A23 = ON
    15: FB PSPS = M2 & M30 & M31 & M95
3: PTP VB=100% VE=100% ACC=100% RobWzg=0 Base=0 SPSTrig=0[1/100s]
{Pno1=2,Pno2=-1,SPSno=-1}
    ;1:
-- Removal position --
-- Close clamping cyl. 1 --
4: PTP VB=100% VE=0% ACC=100% RobWzg=0 Base=0 SPSTrig=5[1/100s] P
{Pno1=3,Pno2=-1,SPSno=3}
    1: FB PSPS = ON
    2: A23 = OFF
    3: WAIT FOR M1
    4: F1 = ON
    5: SPSMACRO343 = ON
    6: WAIT FOR M32
    7: WAIT FOR E23
    8: A23 = ON
    9: FB PSPS = M1 & M30 & M32 & M95
```

FIG. 4a

```
5: PTP VB=100% VE=100% ACC=100% RobWzg=0 Base=0 SPSTrig=0[1/100s]
{Pno1=4,Pno2=-1,SPSno=-1}
   ;1:
6: PTP VB=100% VE=100% ACC=100% RobWzg=0 Base=0 SPSTrig=0[1/100s]
{Pno1=5,Pno2=-1,SPSno=-1}
   ;1:
--Deposit position--
-- Open clamping cyl. 1--
7: PTP VB=100% VE=0% ACC=100% RobWzg=0 Base=0 SPSTrig=5[1/100s] P
{Pno1=6,Pno2=-1,SPSno=4}
   1: FB PSPS = ON
   2: A23 = OFF
   3: F1 = ON
   4: SPSMACRO342 = ON
   5: SPSMACRO340 = ON
   6: WAIT FOR M31
   7: WAIT FOR E23
   8: A23 = ON
   9: FB PSPS = M30 & M31 & M95
-- Overall work complete message--
8: PTP VB=100% VE=0% ACC=100% RobWzg=0 Base=0 SPSTrig=5[1/100s] P
{Pno1=7,Pno2=-1,SPSno=5}
   1: FB PSPS = ON
   2: A23 = OFF
   3: WAIT FOR M2
   4: SPSMACRO15 = ON
   5: WAIT FOR E23
   6: A23 = ON
   7: FB PSPS = M2 & M30 & M31 & M95
9: PTP VB=100% VE=0% ACC=100% RobWzg=0 Base=0 SPSTrig=0[1/100s] P
{Pno1=8,Pno2=-1,SPSno=6}
   1: FB PSPS = ON
   2: t1 (ON) = STOP
   3: t2 (ON) = t1[1/10 sec]
   4: t2 (ON) = STOP
END
```

FIG. 4b

METHOD FOR PROGRAMMING ROBOTS AND COMPUTING DEVICE AND COMPUTER PROGRAM

PRIORITY CLAIM

This patent application claims priority to German Patent Application No. 10 2018 214 417.6, filed 27 Aug. 2018, the disclosure of which is incorporated herein by reference in its entirety.

PRIORITY CLAIM

Summary

Illustrative embodiments relate to the technical field of the programming of robots, drones and other programmable devices which are intended to perform a certain task. In particular, the automatic programming of industrial robots which are used in the production of products is involved.

BRIEF DESCRIPTION OF THE DRAWINGS

Exemplary embodiments are illustrated in the drawings and are explained in more detail below on the basis of the figures, in which.

DETAILED DESCRIPTION

Production robots carry out individual or a plurality of work operations. Many work operations need to be carried out in the case of complex production, for example, during body construction of transportation vehicles. The following are mentioned as examples: gripping components, holding/positioning components, adhesively bonding components, welding components, soldering components, riveting components, milling components, punching components, stamping components, deep-drawing components, etc. There are specialized robots for such tasks, for example, gripping robots, welding robots, riveting robots, adhesive-bonding robots, etc. It is expressly pointed out that the term "production robots" is also intended to concomitantly include those robots which are used in quality assurance. This involves measuring different components/assemblies, which are assembled during production, for checking purposes. The highly accurate measurement is often performed by a robot which is provided with a corresponding measuring device.

The data interface for entering PLC operands and macro instructions in the robot program generated off-line is currently manual. This results in a high error rate with the consequence of a large amount of effort needed to correct the robot programs in the production hall during start-up and installation run-up. According to the prior art, the robot programs are manually corrected in the installation, partially with the assistance of testing tools. In the case of complex production operations, many industrial robots having a large number of different application devices are used. The programming complexity is accordingly high. Incorrect inputs are also unavoidable when manually creating programs. If the programmers are given complete freedom, various programs for the same programming task are produced. These are difficult to compare, and it is difficult for the subsequent programmer in each case to understand and further process the different options.

However, the programmer has difficulty even when various rules need to be heeded. In a large corporation, a wide variety of robot types from different robot manufacturers, for which there are special rules in each case, are used. For a programmer, it is virtually impossible to know all rules by heart and to heed all of these rules. Upon the acceptance of the created programs, it then often emerges that the programs are not in line with the rules and laborious reworking must be carried out to change the programs to the prescribed form. A large amount of time for execution is required since, to some extent, the robots for such corrections and tests are available only at the weekend. The performance of the corrections is then also again dependent on the programmer with partially required repeat corrections. In any case, this requires increased use of personnel in the start-up phase of production installations.

There is a need for standardization, without scope for interpretation, when programming robots. This was identified within the scope of the disclosure.

DE 10 2016 216 409 A1 discloses an apparatus having a processing device for controlling an interaction between a user and a household appliance. The processing device is set up to capture the start of a natural language dialog between a user and the apparatus and to control the household appliance on the basis of the dialog.

DE 10 2016 011 020 A1 discloses a ladder diagram monitoring apparatus which, on a monitor, an operating situation of a ladder program which is executed on a programmable controller installed in a CNC. A comment added to a circuit of the ladder program is provided with a region for displaying information relating to an operating situation of the CNC, the operating situation of the ladder program is reflected in the region, and display data in which the operating situation of the CNC is indicated are displayed.

DE 296 05 700 U1 discloses an apparatus for translating program instructions which control a robot according to DIN 66025, which program instructions are parts programs which are, in turn, formed from sets of program instructions.

DE 100 21 389 A1 discloses a method for controlling a system. To simplify and facilitate the use of the system, provision is made for input control information to be interpreted according to available application devices and for an application device to be controlled according to the interpretation result.

EP 1 571 514 A1 discloses a system for operating and controlling technical processes, having at least one assembly which is a measuring and control device and is connected to sensors and actuators of processes by electrical lines and having a control program, wherein a measuring and control unit, an operating and observation assembly and an optionally provided database, process documentation and possibly further process automation assemblies are connected to one another by data channels and a control program.

EP 1 355 208 A1 system for automating technical processes and/or tests, in which a measuring unit and a control unit, which are connected to sensors and actuators of the process or the test unit by measuring and control channels, at least one library containing visualization objects and control modules, and software controlling the system are provided. The system makes it possible for the user to develop applications without knowledge of programming techniques.

The disclosed embodiments are based on finding such an approach which makes it possible to standardize the programming. This is achieved by a method for programming robots, a computing device for use in the method and a computer program.

Disclosed embodiments provide a method for programming a robot for carrying out an activity, wherein the robot is equipped with a programmable control unit on which the robot control programs are intended to run. According to the proposal, the robot programs are automatically created using a standard program generator, wherein the program generator converts one or more sequences of keywords into valid program code for the programmable control unit. This is carried out in such a manner that the program generator, during conversion with the respective keyword in the respective sequence, retrieves information in a programming rulebook, from which the generator receives the program code appropriate for the respective robot type in the predefined syntax. The program generator combines the received program code sections to form a complete program code. This type of processing of the sequences of keywords results in the complete program code. In this case, the sequence of keywords can be manually created by the programmer. In addition, the programmer must also make certain parameter specifications for certain keywords.

The method provides considerable benefits for programming robots. The keywords themselves are precisely specified and the programmer takes them from a table. An error source could still involve the statement of an incorrect keyword or an incorrect parameter. However, the keywords are specifically matched to the understanding of robotics and are used as placeholders for macros and operands, in particular, PLC macros and PLC operands, and enable a function-oriented didactically secure input to the robot off-line program OLP. A usable standard-compliant robot program results from the raw program, such as the keyword sequences, by a suitable algorithm in conjunction with the programming rulebook. All of the error sources which exist in the case of solely manual programming are therefore avoided.

Automated program creation for robot applications is possible by combining didactically easily manageable functional keywords with a rule-based algorithm.

Wide-scale use of this programming method results in yet further benefits:
 the speed for creating robot programs increases
 all users consistently program the programs in the same manner
 the quality of the programs is increased
 the reworking effort falls
 individual errors are considerably reduced
 installation acceptance—the robots can be accepted at an earlier time.

It is likewise beneficial if the programming rulebook is designed in such a manner that the program generator inserts one or more comments for describing functions into the program code. As a result, the programs become more readable and are better documented.

In a large corporation, there are various sites in various countries. Here, it is beneficial if the OLP generator inserts the comment(s) in a number of a plurality of selected languages, with the result that they can be understood at the respective sites.

It is also beneficial if the programming rulebook is a database which is either stored on the computer on which the program for controlling the robot is created or is installed on a central computer which is connected to the computer. The computer need not be positioned in the vicinity of the robot. It can be accommodated in an office where the programmer works on the off-line program. The complete program is subsequently transmitted to the programmable control apparatus of the robot. The database can be either locally installed on the respective computer or on a central computer to which the office computers are connected.

For the method, when retrieving information in the database, at least one disclosed embodiment provides for the keyword, including parameter specifications if present, to be transmitted to the database in a query and to be used as index information for retrieving information in the database. The keywords address the database as it were. This information is processed by the database in such a manner that it returns the complete program sections. In at least one disclosed embodiment, the database could be organized as an associative memory CAM (Content Addressed Memory).

For a corresponding computing device for carrying out operations of the method, it is beneficial if the computing device has a computing unit with a connection to a programming rulebook which is a database, wherein the computing device is set up to transmit a sequence of keywords describing a control operation to the database and to receive the valid program code for the sequence of keywords from the database.

The corresponding benefits apply to a computing device which is accordingly designed to carry out operations of the method.

The database may be installed in the computing device itself.

For better control of the database, it is beneficial if the computing device is set up to communicate with an external central computer on which the database is installed.

The disclosed embodiments can also be implemented with a computer program which carries out the disclosed method when executed in a computing device.

The present description illustrates the principles of the disclosure. It therefore goes without saying that experts will be able to design different arrangements which, although not explicitly described here, embody principles of the disclosure and the scope of which is likewise intended to be protected.

Various specialized types of production robots are used when producing a complex product. A production line for a transportation vehicle body is considered as an example. There, specialized robots are used, for example, for the following activities: gripping, positioning, depositing, joining, welding, adhesive bonding, screwing, riveting, soldering, milling, stamping, clinching, cutting, laser welding, filling, measuring, etc. This list is typical but does not make any claim to completeness. A corresponding number of specialized robots must be programmed to be able to carry out the activities in a precisely accurate manner.

FIG. 1 shows a view of a robot 10 which is used to grip a component when producing a product. It is likewise used to move the gripped component to another position where it is either held to be mounted on the resulting product by further robots or is simply only deposited. In the second case, the gripping robot serves the purpose of material supply. A typical five-axis robot arm 12 is shown. Gripping jaws 14 are fitted to the robot arm 12. The different axes of the robot arm 12 are indicated by circles. The number of axes does not play an important role for the proposal and the disclosed embodiments can be used in any multi-axis robot type. Single-axis to 12-axis robots which can be operated are currently on the market.

Figure 1A:
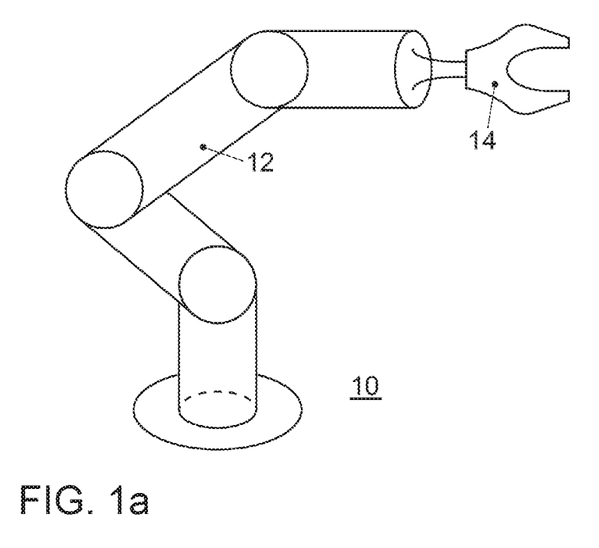
FIGS. 1a-1d show a typical view of a production robot which is specialized for gripping a component at one position and depositing the component at another position.

The programming of the gripping robot is described using an example. An overview of keywords is available to the programmer. The keywords and their meaning are listed therein. The example of using the gripping robot 10 when supplying material is considered in more detail. Its activity can be subdivided into different phases which are illustrated in FIG. 1. The robot 10 is first of all initialized and is moved into the starting position. The starting position is shown in FIG. 1a. In this case, the gripping jaws 14 are open. The robot is then moved to the gripping position. The gripping position can be seen in FIG. 1b. The robot must then be programmed to grip the component 16. FIG. 1c illustrates that the gripping jaws 14 are accordingly closed. The process of moving the robot position to the target position follows. The target position is shown in FIG. 1d. The component 16 is deposited there. Finally, the gripping robot 10 is moved into the starting position again which can already be seen in FIG. 1a.

The electrical and electronic equipment of the robot 10 is not shown in detail in FIG. 1. A programmable logic controller PLC, which is usually positioned beside/in the vicinity of the robot 10, is responsible for controlling the robot. The programmable controller is provided with the reference numeral 70 in FIG. 2. It is also possible for a plurality of programmable controllers to be identically accommodated in a switchgear cabinet, which programmable controllers control a plurality of robots which are then all connected to this switchgear cabinet. The robot 10 must be programmed to perform the desired activity. This is usually carried out away from the programmable controller using an office computer.

Figure 2:
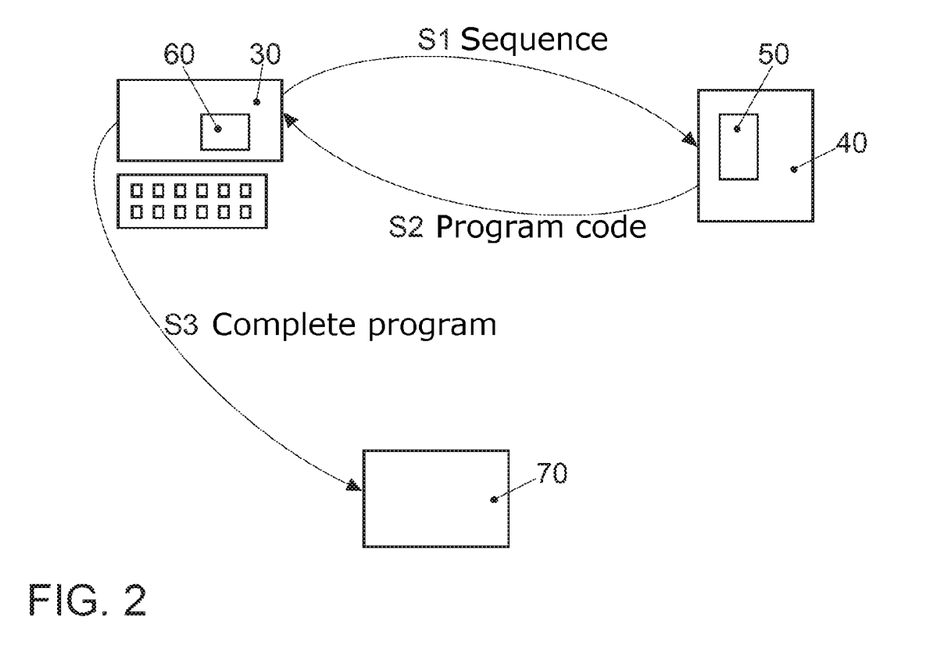
FIG. 2 shows a conceptual view for implementing automatic program creation.

FIG. 2 shows an arrangement of computers for implementing the automatic program creation according to the disclosed embodiments. The reference numeral 30 denotes the office computer on which the programmer controls the creation of the robot program. A program generator 60 which is executed is installed on the office computer 30. The programmer first of all creates a plurality of sequences of keywords for the various control operations. The programmer takes the keywords from a specified table and adds the necessary parameters. In this case, the result is a plurality of sequences of keywords which are compiled in a series. The program generator 60 evaluates this series and transmits the various keyword sequences to a central computer 40. A database 50 is installed on the central computer 40. The database contains the programming rulebook. The appropriate program code sections which conform to the programming guideline of the company are also found in the database for each keyword, which program code sections are taken from the database 50 and are transmitted back to the office computer 30. The program generator 60 compiles the received code sections to form the complete program code. The complete program code can also be individually processed in the office computer 30 for an individual special feature. The programmer manually carries this out. The completed program is transmitted to the programmable control apparatus 70 of the industrial computer 10.

The programming is therefore carried out in three operations:

In operation at S1, the programmer will input the keywords which are suitable for programming. An overview of keywords is available to the programmer for this purpose. The keywords for the gripper with their meaning are listed in the overview of keywords.

Extract from table:
| 6.0 Gripper | |
| --- | --- |
| BTK 1,... | Component checking query, usually a flag |
| G_AUF 1,... | Clamping group OPEN, can be combined with flag |
| G_ZU 1,... | Clamping group CLOSED, can be combined with flag |
| 32.0 Special Users | |
| WAIT FOR OFF,... | Wait condition, multiple |

The following sequence of keywords is created for the first phase of the application shown in FIG. 1 with respect to the supply of material. This is the initialization phase:

```
PTP VB=100% VE=100% ACC=100% RobWzg=0
Base=0 SPSTrig=0[1/100s]
Wait for series start
-- G_AUF 1,M2 --
-- BTK 2 --
PTP VB=100% VE=100% ACC=100% RobWzg=0
Base=0 SPSTrig=0[1/100s]
```

Figure 1B:
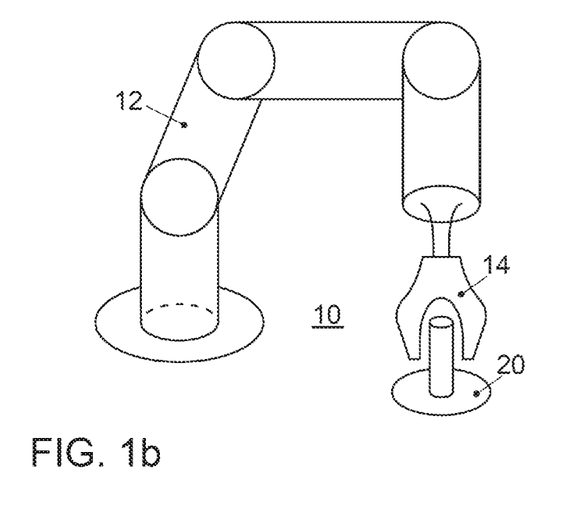
Figure 1C:
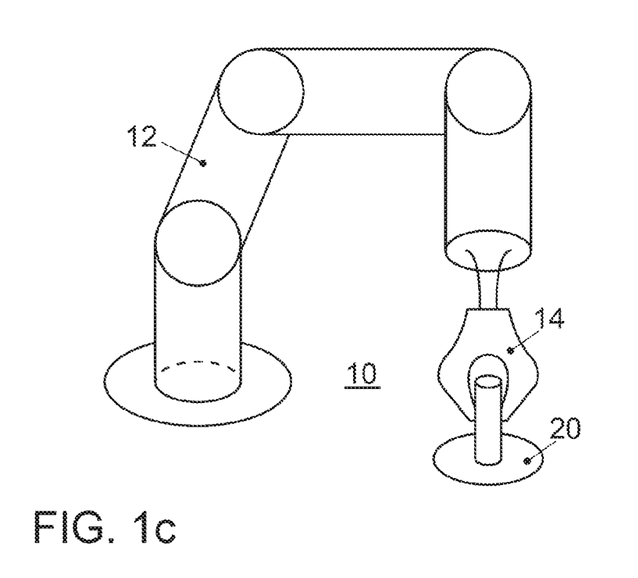
Figure 1D:
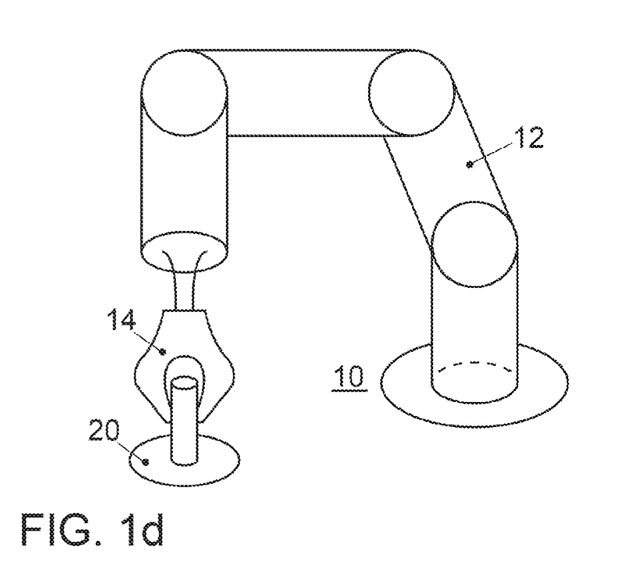

The second phase, see FIG. 1b, relates to the movement of the robot arm 12 to the gripping position.

To achieve this, the programmer creates the following sequence of keywords:

```
-- Removal position --
-- BTK 1 --
-- G_ZU 1 --
PTP VB=100% VE=100% ACC=100% RobWzg=0
Base=0 SPSTrig=0[1/100s]
```

In this case, the expression "removal position" does not correspond to a keyword, but rather to a desired remaining comment.

The third phase, see FIG. 1c, relates to the movement of the robot arm 12 to the deposit position. However, a keyword sequence is not manually created for this purpose, but rather only the corresponding position specification is made, see sequence 2: in FIG. 3.

```
2: PTP VB=100% VE=100% ACC=100% RobWzg=0
Base=0 SPSTrig=0[1/100s]
{Pno1=1,Pno2=-1, SPSno=-1}; 1:
```

The running conditions, with regard to mechanical certainties from previous releases by the superordinate programmable controller (SPS) and their own conditions, for instance component checks (BTK), are inserted into the complete program by the OLP program generator 60. An example of the conversion into program code:

FB PSPS=M1 & M30 & M32 & M95

FIG. 1d also shows the phase for depositing the gripped component 20. The corresponding sequence of keywords is listed below:

```
-- M1 --
-- Deposit position --
-- G_AUF 1 --
PTP VB=100% VE=100% ACC=100% RobWzg=0
```

```
Base=0 SPSTrig=0[1/100s]
-- WAIT FOR M2 --
-- M2 --
PTP VB=100% VE=100% ACC=100% RobWzg=0
Base=0 SPSTrig=0[1/100s]
```

A program part is again automatically generated for approaching the starting position, without a keyword sequence. The sequences are always the same and are specified. The following example, derived from guidelines, shows a representation of the completely generated code for approaching the starting position:
—Overall Work Complete Message—

```
PTP VB=100% VE=0% ACC=100% RobWzg=0
Base=0 SPSTrig=5[1/100s]P
FB PSPS = ON
A23 = OFF
WAIT FOR M2
SPSMACRO15 = ON
WAIT FOR E23
A23 = ON
FB PSPS = M2 & M30 & M31 & M95
PTP VB=100% VE=0% ACC=100% RobWzg=0
Base=0 SPSTrig=0[1/100s]P
FB PSPS = ON
t1 (ON) = STOP
t2 (ON) = t1[1/10sec]
t2 (ON) = STOP
```

Figure 3:
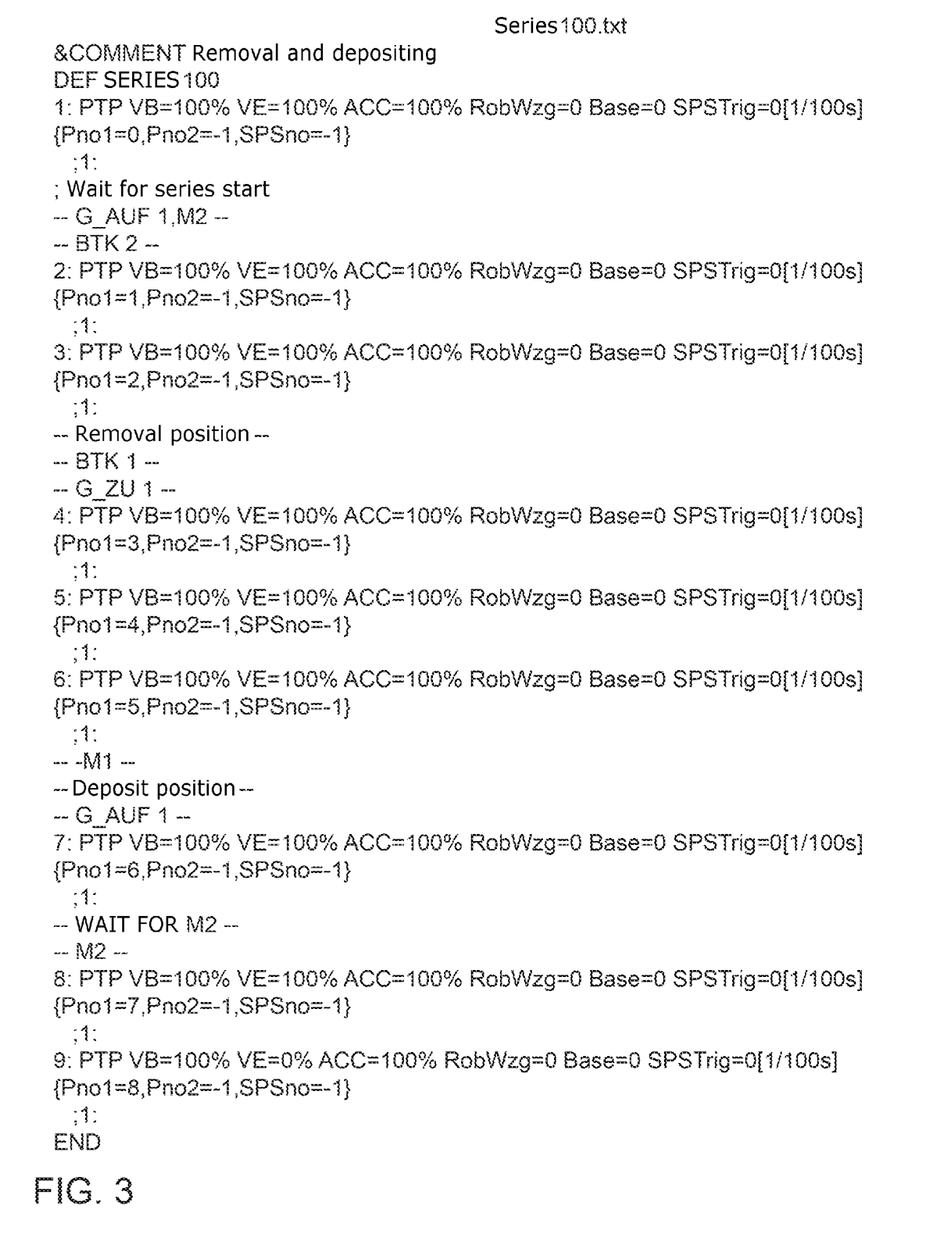
FIG. 3 shows a text document containing a list of the keyword sequences needed to program the gripping robot.

The complete keyword sequences for the example shown in FIG. 1 are shown in FIG. 3. FIG. 3 shows a document which is generated with the text editor and has the title "Series100". A total of 9 sequences are listed therein. In this case, only sequences 1:, 3:, 6: and 7: relate to the keyword sequences described above and created by the programmer. The other sequences are automatically added by the OLP generator program 60. The document is referred to as a series because it already contains more than the keyword sequences. A series is already a so-called coordinate program when programming robots.

After the keyword sequences for the individual control phases have been created in operation at S1, the keyword sequences are then converted into true program code. Basic programs which contain program code in the application-oriented programming language are produced in this case. These are PLC macros and PLC operands which are also known from the programming of programmable logic controllers. This is carried out with the aid of the database 50 and the algorithm 60 in operation at S2.

This conversion is carried out automatically without the assistance of the programmer. For this purpose, the conversion tool uses a programming guideline which was created by the company using the robot. This guideline contains the rules which should be heeded for programming according to company directives. This is necessary to comply with safety regulations, for example. However, it is also used such that the programs remain readable and comprehensible. This is a decisive point in the case of a large corporation using industrial robots at different sites where different languages are also spoken. Various cases of incorrect programming can then also be avoided by this standardization of the programming.

Examples of rules which are cited in the programming guideline: rules for bypassing obstacles, rules for allowable positions or locks, rules for clamping feedback and parts checks, rules for stating positions and coordinates, rules for grippers, releases and flags, rules for the types of interpolation to be used, rules for programming jump instructions, rules for stating movement parameters, rules and examples for programming subroutines and macros, rules for programming series, rules for programming series repetitions, rules for initialization phases, rules for technology calls, rules for programming tool change operations, rules for programming work complete messages, etc.

EXAMPLES

2. Programming Handling Tasks with Clamping Groups
2.1 Programming Point 2 in a Series Example: Gripper Having 4 Clamping Groups and 2 Component Checks

```
2: PTP VB=100% VE=0% ACC=100% RobWzg=1 Base=1
   SPSTrig=0[1/100s]
1: FB PSPS = ON           ~ Online running conditions
                            switched off
2: AS23 = OFF             ~ Safety guard locked
3: t1 (ON) = 0 [1/10sec]  ~ Start cycle time measurement
4: SPS MACRO50 = ON       ~ Flag initialization
5: A80 = ON               ~ Release clamps OPEN/CLOSED
6: A15 = OFF              ~ Switch off "basic position" message
7: F1 = ON                ~ Preselection of clamping group 1
8: F2 = ON                ~ Preselection of clamping group 2
9: F3 = ON                ~ Preselection of clamping group 3
10: F4 = ON               ~ Preselection of clamping group 4
11: SPS MACRO342 =        ~ Gripper OPEN
    !E579 & !E580
12: SPS MACRO340 = ON     ~ Initialize gripper
13: WAIT FOR M31 & M33 &  ~ Query gripper is OPEN
    M35 & M37
14: WAIT FOR E23          ~ No access requirement
15: A23 = ON              ~ Safety guard locked
16: FB PSPS = E14 & E24 & E80 & M31 & M33 & M35 & M37
```

4.3 Programming Last Point in a Series

In the last point in the respective series, the corresponding time for the total cycle time should be stopped, the value should be saved and monitoring times should possibly be triggered.

Example

```
55: PTP VB=100% VE=0% ACC=100%
    RobWzg=1 Base=1 SPSTrig=0[1/100s]
1: FB PSPS = ON
2: t1 (ON) = STOP         ~ Total cycle time of current run
3: t2 (ON) = t1 [1/10sec]
4: t2 (ON) = STOP
```

Series
Overall Work Complete Message

```
W: PTP VB=100% VE=0% ACC=100%
RobWzg=1 Base=1 SPSTrig=5[1/100s]
1: FB PSPS = ON
2: A23 = OFF              ~ Safety guard released
3: SPS MACRO15 = ON       ~ Overall work complete message
4: WAIT FOR E23           ~ Running approval by PLC
5: A23 = ON               ~ Safety guard locked
6: FB PSPS = M30 & E80 & M95
```

The Macro15 for the overall work complete message can be called only at the end of the series, but not in the last point. If necessary, the last point must be copied and inserted as the penultimate point.

The programming guideline can be implemented as a database on the office computer 30 or on the central computer 40 which is connected to the office computer 30 via a network. The respective keyword in the keyword sequence, which is intended to be converted, is used as address information, under which the relevant rules can be found in the database 50. The conversion of the keyword with the optional parameter specifications is then carried out using the code examples contained in the database 50 for the keyword and the rules. An algorithm as part of the OLP program generator 60, which runs on the office computer 30, assembles the individual code sections to form a program. Basic programs which are largely complete are produced by the conversion. Particular comment lines are also automatically generated. If multilingual comments are intended to be inserted, the language selection can be input in a menu of the converter tool before conversion.

Figure 4A:
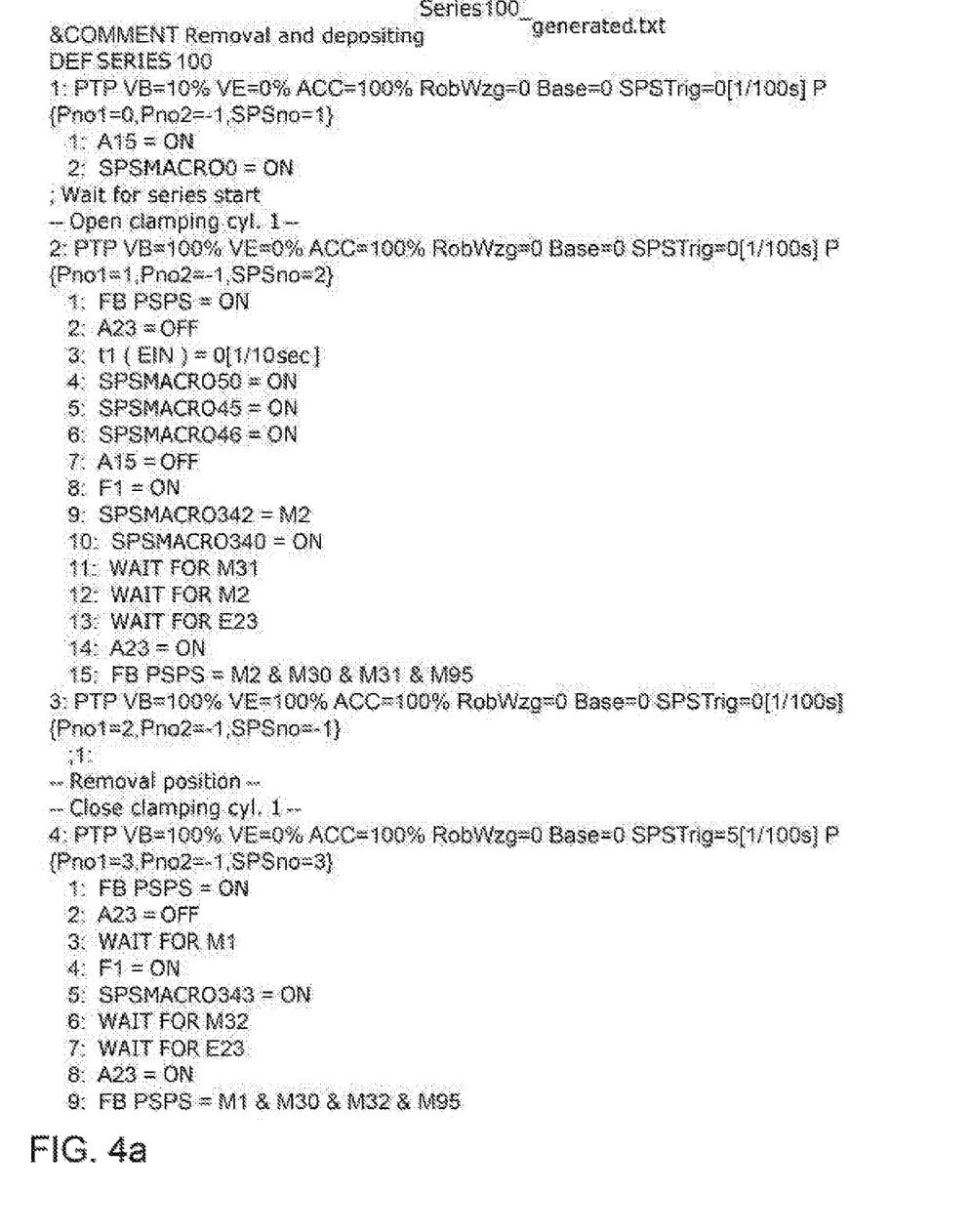
FIG. 4a shows the first part of a text document containing the fully converted program with program code for the various sequences shown in FIG. 3.
Figure 4B:
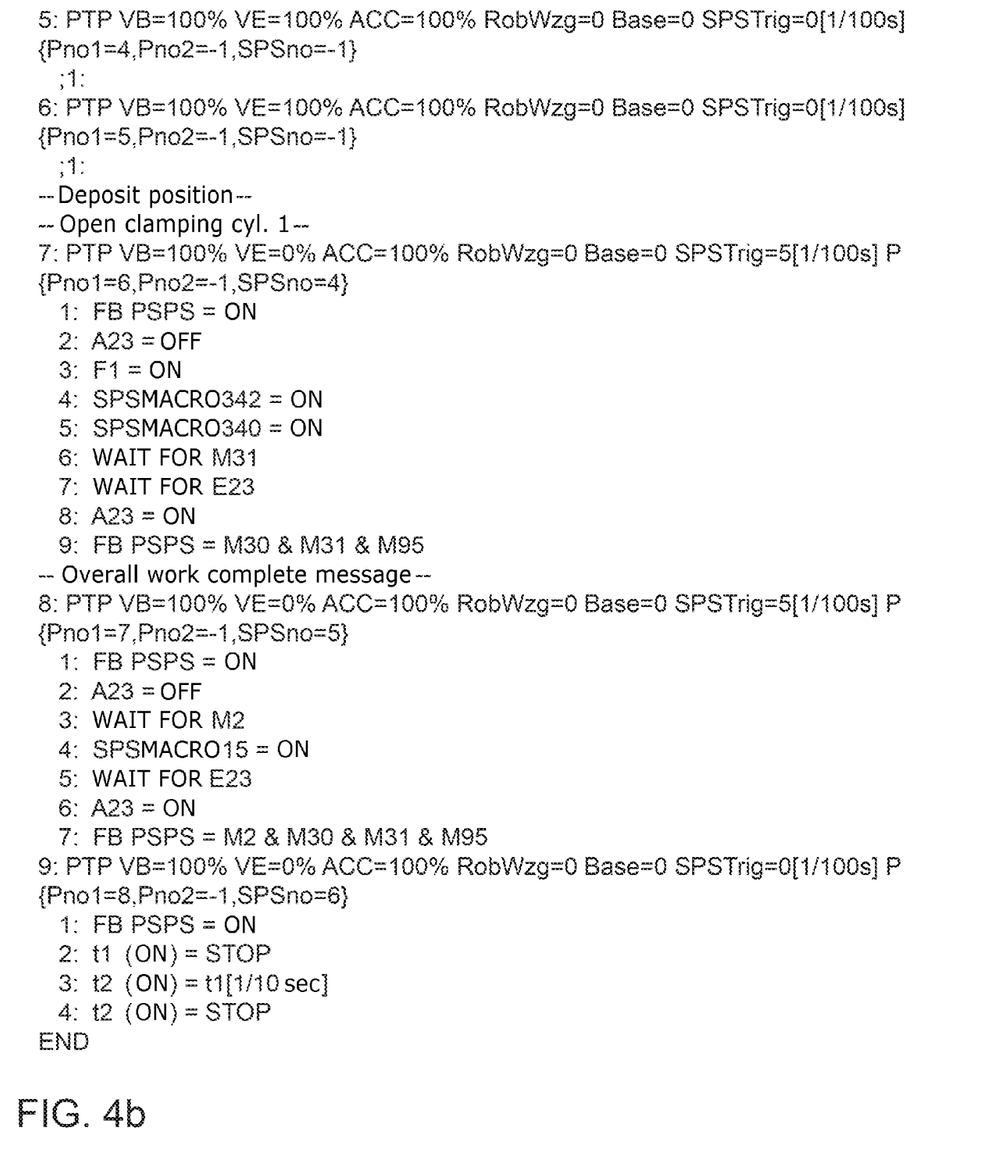
FIG. 4b shows the second part of the text document containing the fully converted program with program code for the various sequences shown in FIG. 3.

FIG. 4 shows the complete program code for the 9 sequences which are shown in FIG. 3.

The document showing the complete program code has the title "Series100_generated". In addition to the program code, it also contains some important comment lines. All examples mentioned herein and conditional formulations should be understood without restriction to such specially cited examples. It is recognized by experts, for example, that an illustrated flowchart, state transition diagram, pseudocode and the like are different options for representing processes which are substantially stored on computer-readable media and can therefore be executed by a computer or a processor.

It should be understood that the proposed method and the associated apparatuses can be implemented in various forms of hardware, software, firmware, special processors or a combination thereof. Special processors may comprise application-specific integrated circuits (ASICs), reduced instruction set computers (RISCs) and/or field programmable gate arrays (FPGAs). The proposed method and the apparatus may be implemented as a combination of hardware and software. This software may be installed as an application program on a program memory apparatus. This is typically a machine based on a computer platform having hardware, for example, one or more central processing units (CPU), a random access memory (RAM) and one or more input/output (110) interfaces. An operating system is typically also installed on the computer platform. The various processes and functions described here may be part of the application program or a part which is executed using the operating system.

LIST OF REFERENCE SIGNS

10 Robot
12 Robot arm
14 Gripping jaws
20 Component
30 Office computer
40 Central computer
50 Database
60 Algorithm
70 Programmable control apparatus
S1-S3 Different operations of the programming method

The invention claimed is:

1. A computing device for programming a robot, the computing device comprising:
 a program generator computing device coupled to a programming rulebook and a programmable controller of the robot, wherein the programming rulebook is a database,
 wherein the program generator computing device is configured to
  receive, from a user, a plurality of sequences of keywords describing a control operation to be performed by the robot, wherein each of the plurality of sequences of keywords includes two or more keywords selected by the user from a keyword table, wherein each of the two or more keywords is a placeholder for macros and operands, and wherein each of the plurality of sequences of keywords includes a parameter specification added by the user to at least one of the two or more keywords,
  compile into a series the plurality of sequences of keywords and transmit, to the programming rulebook database, the compiled plurality of sequences of keywords,
  convert, at the programming rulebook database, each of the two or more keywords of the compiled sequences of keywords into a program code section compatible with the programmable controller
  receive, from the programming rulebook database, the program code sections corresponding to the one or more transmitted sequences of keywords, wherein each of the program code is in a predefined syntax used by the robot,
  compile the received program code sections to generate a complete program code, and
  transmit, to the programmable controller, the complete program code to cause the robot to perform the control operation.

2. The computing device of claim 1, further comprising the programming rulebook database, which is installed on the computing device.

3. The computing device of claim 1, wherein the computing device communicates with an external central computer housing the programming rulebook database.

4. The computing device of claim 1, wherein the program generator inserts one or more comments for describing functions into the complete program code.

5. The computing device of claim 4, wherein the program generator inserts the comments in a plurality of selected languages.

6. The computing device of claim 1, wherein the programming rulebook database is either stored on the computer on which the program for controlling the robot is created or is installed on a central computer connected to the computer.

7. The computing device of claim 6, wherein, when retrieving information in the programming rulebook database, a keyword of the at least one sequence of keywords, including parameter specifications, when present, is transmitted to the programming rulebook database in a query and is used as index information for retrieving information in the in the programming rulebook database.

8. A computer program stored on a non-transitory computer readable medium and, when executed in a computing device, carries out a method for programming a robot for carrying out a control operation, wherein the robot includes a programmable controller, wherein the method for programming the robot comprises:

generating, by a program generator, a robot program to be executed by the programmable controller of the robot to cause the robot to carry out the control operation, wherein generating the robot program includes receiving, from a user, a plurality of sequences of keywords, wherein each of the plurality of sequences of keywords includes two or more keywords selected by the user from a keyword table, wherein each of the two or more keywords is a placeholder for macros and operands, and wherein each of the one or more sequences of keywords includes a parameter specification added by the user to at least one of the two or more keywords, compiling into a series the plurality of sequences of keywords and transmitting, to the programming rulebook database, the compiled plurality of sequences of keywords, converting, at the programming rulebook database, each of the two or more keywords of the compiled sequences of keywords into a program code section compatible with the programmable controller, receiving, from the programming rulebook database, a plurality of program code sections, wherein each of the plurality of program code sections uses a predefined syntax corresponding to a type of the robot, compiling, by the program generator, the plurality of program code sections to generate a complete program code, wherein the generated robot program includes the complete program code, and transmitting the generated robot program to the programmable controller to cause the robot to carry out the control operation.

9. The computer program stored on the non-transitory computer readable medium of claim 8, wherein the method further comprises the programming rulebook database, which is installed on the computing device.

10. The computer program stored on the non-transitory computer readable medium of claim 8, wherein the computing device communicates with an external central computer housing the programming rulebook database.

11. The computer program stored on the non-transitory computer readable medium of claim 8, wherein the program generator inserts one or more comments for describing functions into the complete program code.

12. The computer program stored on the non-transitory computer readable medium of claim 11, wherein the program generator inserts the comments in a plurality of selected languages.

13. The computer program stored on the non-transitory computer readable medium of claim 8, wherein the programming rulebook database is either stored on the computer on which the program for controlling the robot is created or is installed on a central computer connected to the computer.

14. The computer program stored on the non-transitory computer readable medium of claim 8, wherein, when retrieving information in the programming rulebook database, a keyword of the at least one sequence of keywords, including parameter specifications, when present, is transmitted to the programming rulebook database in a query and is used as index information for retrieving information in the in the programming rulebook database.

15. A method for programming a robot for carrying out a control operation, wherein the robot includes a programmable controller, the method comprising:

generating, using a program generator, a robot program to be executed by the programmable controller of the robot to cause the robot to carry out the control operation, wherein generating the robot program includes receiving, from a user, a plurality of sequences of keywords, wherein each of the plurality of sequences of keywords includes two or more keywords selected by the user from a keyword table, wherein each of the two or more keywords is a placeholder for macros and operands, and wherein each of the plurality of sequences of keywords includes a parameter specification added by the user to at least one of the two or more keywords, compiling into a series the plurality of sequences of keywords and transmitting, to the programming rulebook database, the compiled plurality of sequences of keywords, converting, at the programming rulebook database, each of the two or more keywords of the compiled sequences of keywords into a program code section compatible with the programmable controller, receiving, from the programming rulebook database, a plurality of program code sections, wherein each of the plurality of program code sections uses a predefined syntax corresponding to a type of the robot, compiling, by the program generator, the plurality of program code sections to generate a complete program code, wherein the generated robot program includes the complete program code, and transmitting the generated robot program to the programmable controller to cause the robot to carry out the control operation.

16. The method of claim 15, further comprising the programming rulebook database, which is installed on the computing device.

17. The method of claim 15, wherein the computing device communicates with an external central computer housing the programming rulebook database.

18. The method of claim 15, wherein the program generator inserts one or more comments for describing functions into the complete program code.

19. The method of claim 18, wherein the program generator inserts the comments in a plurality of selected languages.

20. The method of claim 15, wherein the programming rulebook database is either stored on the computer on which the program for controlling the robot is created or is installed on a central computer connected to the computer.

21. The method of claim 20, wherein, when retrieving information in the programming rulebook database, a keyword of the at least one sequence of keywords, including parameter specifications, when present, is transmitted to the programming rulebook database in a query and is used as index information for retrieving information in the in the programming rulebook database.

* * * * *